United States Patent [19]

Phares, Jr.

[11] E Re. 29,693

[45] Reissued Jul. 4, 1978

[54] PROCESS OF SOAKING AND STERILIZING HYDROPHILIC SOFT CONTACT LENS WITH CHLORHEXIDINE

[75] Inventor: Russell E. Phares, Jr., Saratoga, Calif.

[73] Assignee: Barnes-Hind Pharmaceuticals, Inc., Sunnyvale, Calif.

[21] Appl. No.: 629,729

[22] Filed: Nov. 6, 1975

Related U.S. Patent Documents

Reissue of:

[64] Patent No.: 3,689,673
Issued: Sep. 5, 1972
Appl. No.: 88,521
Filed: Nov. 10, 1970

[51] Int. Cl.[2] ..... A01N 9/20; A01N 9/24

[52] U.S. Cl. ..... 424/326

[58] Field of Search ..... 424/326

[56] References Cited

U.S. PATENT DOCUMENTS

| | | | |
|---|---|---|---|
| 2,684,924 | 7/1954 | Rose et al. | 252/106 X |
| 3,240,709 | 3/1966 | Rankin | 252/106 X |
| 3,361,858 | 1/1968 | Wichterle | 264/1 |

OTHER PUBLICATIONS

Davies et al., Brit. J. Pharm., (1954), 9, 192 & 196.

Lawrence, J. APHA, Sci. Ed., vol. 49, No. 11, Nov., 1960.

Anderson et al., The Pharmaceutical Journal, 6/13/64, pp. 593–594.

Australian J. Pharm., 42:1284–1285, (1961).

*Primary Examiner*—Albert T. Meyers
*Assistant Examiner*—D. W. Robinson
*Attorney, Agent, or Firm*—Townsend and Townsend

[57] ABSTRACT

Chlorhexidene solutions are employed to sterilize and soak both hard and soft contact lenses.

8 Claims, No Drawings

PROCESS OF SOAKING AND STERILIZING HYDROPHILIC SOFT CONTACT LENS WITH CHLORHEXIDINE

Matter enclosed in heavy brackets [ ] appears in the original patent but forms no part of this reissue specification; matter printed in italics indicates the additions made by reissue.

SUMMARY OF THE INVENTION

In the past contact lenses have been almost universally made of a hard plastic such as cross linked polymethylmethacrylate. Such lenses can be sterilized and soaked in a wide variety of antiseptic solutions as are known in the prior art. Recently soft lenses have been introduced, including the lens commonly called the gel lens, which is a hydrophilic plastic and the silicone lens which is a hydrophobic plastic.

Thus, soft lenses can be divided into two broad categories, namely hydrophilic and hydrophobic. There are only two major hydrophilic lenses now being considered for commercial production. Both of these lenses have as their basis polyhydroxyethyl methacrylate which has been cross linked with hydroxyethyl dimethacrylate. There is about one cross linking molecule for every 200 monomer units. The more cross linking, the less water that is absorbed by the lens, and the higher the refractive index of the material. There are many variations that can be made using this basic composition. These variations have an effect in determining the physical characteristics of the material. By means of comparison, it is interesting to note that the conventional hard contact lens consists of polymethylmethacrylate cross linked with hydroxyethyl dimethacrylate and that the absence of a hydrophilic OH group accounts for the tremendous difference in the physical behavior of the two materials.

The second category of soft contact lenses, namely hydrophobic lenses, are exemplified by the silicone lens. These lenses are made from cross linked dimethyl polysiloxane which is commonly known as Antifoam A and is sold by Dow Corning as Silastic S. About 40 percent silica is mixed with the siloxane polymer as a filler and the entire mixture is cooked at a very high pressure in order to achieve further polymerization and cross linking. The concentration of silica helps to determine the refractive index of the final lens.

An important property of soft lenses is their adsorptive or binding ability, which is commonly confused with absorptive properties. Since the hydrophilic lens has the ability to absorb water, it will by necessity absorb a solution of any chemical which might be presented to it. This does not create a problem if the solution itself is safe in the eye. A potential problem arises, however, if the soft lens can absorb or concentrate chemicals. When this happens a wearer can be putting more than a safe concentration of chemical into his eye. A big area of concern are those chemicals which are used as antimicrobial agents. These materials are harmful to living bacterial cells and will generally be damaging to the cells in the eye if they are present in higher than normal concentrations.

If one attempts to sterilize soft lenses in the conventional solutions employed for hard contact lenses, the active sterilizing ingredient such as, for example, benzalkonium chloride, [thimerosal,] phenyl mercuric acetate and other well known compounds are concentrated or bound by the adsorptive or absorptive properties of the soft lens. Thus, the solutions conventionally used for the hard lenses become unusable for sterilizing soft lenses, the high concentration of the sterilant causes irritation of the eyes and actual injury in many instances. Applicant has examined the adsorbing or concentrating affect of hydrophilic lenses on commonly used antimicrobial agents and found that many of these chemicals are concentrated to some extent. The following table illustrates this:

BINDING TO HYDROPHILIC LENSES

| Chemical | Maximum Amount Bound/Lens | Conc. of Sd. to Cause 50% of Maximum Binding |
|---|---|---|
| Benzalkonium Chloride | 3.8 mg | 0.79 mg/ml |
| Chlorobutanol | 1.8 mg | 2.48 mg/ml |
| Phenylethyl Alcohol | 0.3–0.4 mg | 2 mg/ml |
| Benzyl Alcohol | 0.3–0.4 mg | 2 mg/ml |
| Methyl Paraben | 0.67 mg | 0.2 mg/ml |
| Propyl Paraben | 0.27 mg | 0.008 mg/ml |
| Phenylmercuric Acetate | 0.25 mg | 0.76 mg/ml |

Further tests which were made with rabbits showed that hydrophilic gel lenses soaked in various of the preservatives caused actual damage to the cornea. Similar in vitro and in vivo tests have shown the undesirability of such antimicrobial agents when used with hydrophobic lenses. The manufacturer of one of the hydrophilic lenses specifies that it be sterilized by first soaking in hydrogen peroxide, then sodium bicarbonate and finally normal saline, all at room temperature. The other hydrophilic lens is sterilized by boiling it in normal saline.

Tests have shown that repeated boiling of hydrophilic material tends to render it flaccid. Although applicant has not found any problems with soaking hydrophilic materials in the commonly used 3 percent hydrogen peroxide, soaking them for 48 hours in 10 percent hydrogen peroxide completely dissolves them. This could create a potential problem if a patient gets the wrong hydrogen peroxide from the pharmacy.

Surprisingly, it has been found that chlorhexidene, i.e., 1,6-di(N-p-chlorophenyldiguanido)hexane, can be udsed to sterilize soft contact lenses, both hydrophilic and hydrophobic as well as hard lenses and there is no concentration of the sterilant which could cause irritation or injury to the eye of the subsequent user. [There is no binding when solutions are subjected to the test outlined in the table.]

Aqueous chlorhexidene solutions are effective which contain from 0.001 to 0.1 percent by weight of the sterilant and the free base as well as any of the well known salts can be used such as the digluconate, diacetate and dihydrochloride.

In its simplest form, the invention merely involves immersing the lens in such a solution of chlorhexidene. It is desirable to make the solution isotonic and for this purpose any of the well known agents may be used. Sodium chloride or sodium nitrate may be used at the lower concentrations of chlorhexidene, i.e., up to about 0.02 percent, but with higher concentrations such salts tend to precipitate out so that it is preferred to employ materials such as glucose, propylene glycol, glycerine, mannitol, lactose, boric acid and the like with such higher concentrations. Preferably the pH of the solution is adjusted to form about 4.5 to 8.5, or even more preferably about 7.4, so that the lens will be comfortable when inserted in the eye. Other materials commonly used in contact lens solutions may also be employed such as buffering, chelating and thickening agents.

In order to test the effectiveness of chlorhexidene, lenses were inoculated with various test organisms and then placed in solutions of various strengths of chlorhexidene. Periodically the lenses were removed and both the lens and solution tested for sterility. The maximum time to reach sterility for any of the organisms was recorded. The test organisms were:

pseudomonas aeruginosa
staphylococcus aureus
escherichia coli
candida albicans

The following maximum times to reach sterility were found:

| | |
|---|---|
| 0.01% chlorhexidene | 30 minutes |
| 0.004% chlorhexidene | 1 hour |
| 0.001% chlorhexidene | 2–3 hours |

To confirm the safety of the solution, human subjects wore soft lenses which had been soaked in 0.01 percent solutions of chlorhexidene. Repeated wearings of 8 hours per day produced no discomfort or injury.

DESCRIPTION OF THE PREFERRED EMBODIMENTS

As has been stated, the invention in its simplest form consists merely of an aqueous solution of chlorhexidene which is employed to sterilize contact lenses but many other agents may be employed.

The following non-limiting examples illustrate preferred embodiments of the invention. All percentages are by weight. All of these solutions have been found effective for the sterilization of both hard and soft contact lenses.

EXAMPLE I

| | |
|---|---|
| Chlorhexidene digloconate | 0.001% |
| Water q.s. | 100% |

EXAMPLE II

| | |
|---|---|
| Chlorhexidene diacetate | 0.1% |
| Water q.s. | 100 |

EXAMPLE III

| | |
|---|---|
| Chlorhexidene dihydrochloride | .01% |
| NaCl | 0.9% |
| NaOH q.s. | pH 6. |
| Water q.s. | 100 |

[EXAMPLE IV]

[

| | |
|---|---|
| Chlorhexidene (free base) | 0.004% |
| Glycerine | 2.0% |
| NaOH q.s. | pH 4.5 |
| Water q.s. | 200 |

]

EXAMPLE [V] *IV*

| | |
|---|---|
| Chlorhexidene digluconate | 0.004% |
| Propylene glycol | 2.0% |
| NaOH q.s. | pH 7.4 |
| Water q.s. | 100. |

EXAMPLE [VI] *V*

| | |
|---|---|
| Chlorhexidene dihydrochloride | 0.001% |
| Boric acid | 1.9% |
| KOH q.s. | pH 7 |
| Water q.s. | 100 |

EXAMPLE [VII] *VI* through [X] *IX*

Solutions were made up similar to Example [VI] *V* except that various isotonic agents were substituted as follows:

| | |
|---|---|
| boric acid | 1.9% |
| lactose | 9.75% |
| mannitol | 5.7% |
| sodium nitrate | 1% |

I claim:

1. The process of soaking and sterilizing hydrophilic soft contact lenses comprising placing a lens in an aqueous solution containing from about [0.001] *0.004* percent to [0.1] *0.01* percent of chlorhexidene for a time sufficient to sterilize said lens.

2. The process of claim 1 wherein the chlorhexidene is, employed as a salt selected from the group consisting of digluconate, diacetate and dihydrochloride.

3. The process of claim 1 wherein the aqueous solution is an isotonic solution containing an isotonic agent.

4. The process of claim 3 wherein the isotomic agent is selected from the group consisting of sodium chloride, sodium citrate, boric acid, sodium nitrate, propylene glycol, glycerine and mannitol.

5. The process of claim 1 wherein The aqueous solution has a pH of 4.5 to 8.5.

6. The process of claim 5 wherein the pH is about 7.4.

*7. The process according to claim 1 wherein said hydrophilic soft contact lenses are consisting essentially of polyhydroxyethyl methacrylate cross-linked with hydroxyethyl dimethacrylate.*

*8. A process according to claim 2, wherein said hydrophilic soft contact lenses are consisting essentially of polyhydroxyethyl methacrylate cross-linked with hydroxyethyl dimethacrylate.*

* * * * *